E. E. CHESNEY.
Improvement in Seed Planters.

No. 120,241. Patented Oct. 24, 1871.

Witnesses:
E. Wolff.
Gustave Dietrich

Inventor:
E. E. Chesney
Per Munn & Co.
Attorneys.

120,241

UNITED STATES PATENT OFFICE.

EZRA E. CHESNEY, OF BUSHNELL, ILLINOIS.

IMPROVEMENT IN SEED-PLANTERS.

Specification forming part of Letters Patent No. 120,241, dated October 24, 1871.

*To all whom it may concern:*

Be it known that I, EZRA E. CHESNEY, of Bushnell, in the county of McDonough and State of Illinois, have invented a new and Improved Seed-Planter; and I do hereby declare that the following is a full, clear, and exact description thereof, which will enable others skilled in the art to make and use the same, reference being had to the accompanying drawing forming a part of this specification, in which—

Figure 1:
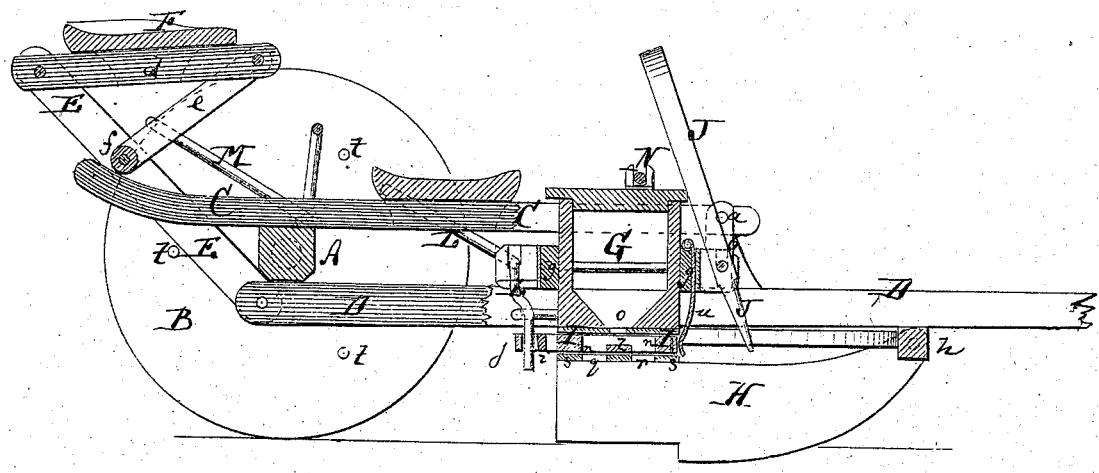
Figure 2:
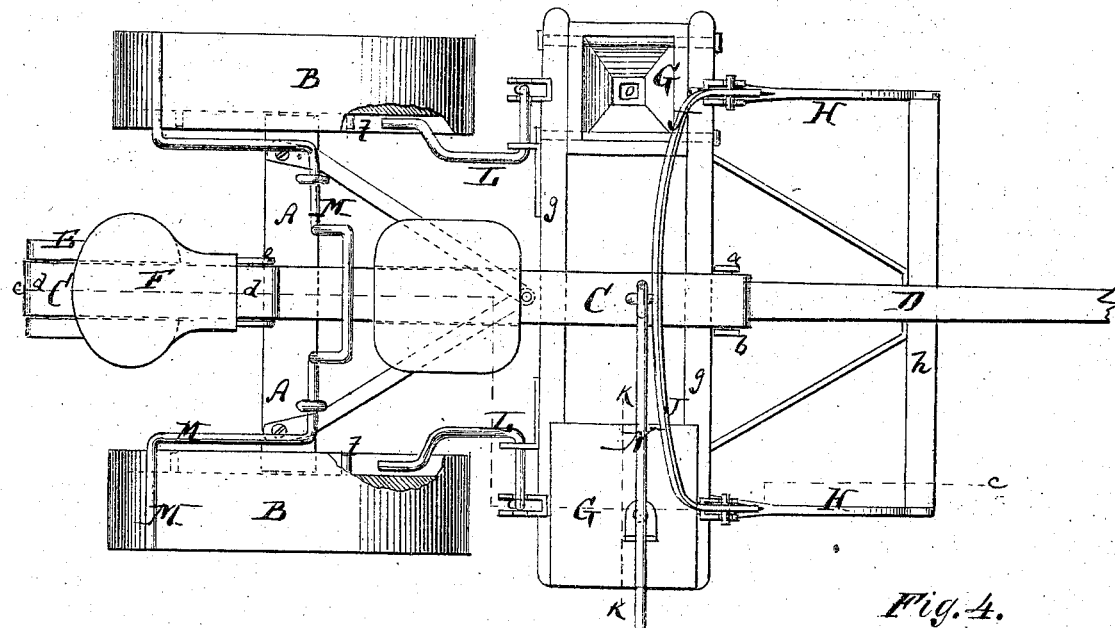
Figure 3:
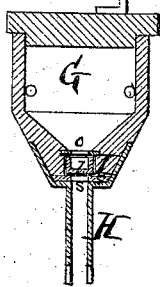
Figure 4:
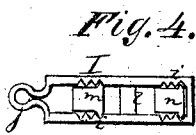

Figure 1 represents a vertical longitudinal section of my improved seed-planter, line $c\ c$, Fig. 2, indicating the plane of section. Fig. 2 is a plan or top view of the same. Fig. 3 is a detail vertical transverse section of the seed-box, the line $k\ k$, Fig. 2, indicating the plane of section. Fig. 4 is a detail top view of the seed-slide.

Similar letters of reference indicate corresponding parts.

My invention consists in the improvement of seeders, as hereinafter fully described and subsequently pointed out in the claim.

A in the drawing represents the hind axle of the seed-planter, carrying the wheels B B, which turn loose on its ends. C is a perch or longitudinal beam rigidly affixed to the middle of the axle and projecting forward and backward from the same. The front end of the beam C is at $a$ pivoted to a projecting ear, $b$, of the tongue D, said tongue extending backward under the beam about as far as the axle. To the back end of the tongue is pivoted a double post, E, straddling the beam C, and carrying at its upper end the seat-support $d$, which is braced at $e$ on the post. The seat F slides on the support $d$. $f$ is a friction-roller or cross-piece between the parts of the post E resting upon the beam. To the tongue, directly behind the ear $b$, are rigidly affixed the cross-pieces $g\ g$, which support the seed-boxes G G, and also the furrow-scrapers H H, whose front ends are secured to a front cross-bar, $h$, on the tongue. When the seat F is slid forward on the support $d$ it will cause the scrapers to set deep in the ground. The more the seat is shifted back the more will it raise the scrapers. When the seat is quite thrown back it will cause the cross-piece $f$ to bear upon the back end of the tongue in such manner as to raise the scrapers clear out of the ground. The driver is thus enabled not only to regulate the depth to which the seed is deposited, but also to entirely raise the scrapers out of the ground at the end of every row without being obliged to get off his seat. A great saving of time in the planting of seed is thus effected by extremely simple means. I I are the seed-slides, working in the contracted lower parts of the boxes G. Each slide consists, as in Fig. 4, of a metal rim, $i$, bent into rectangular form, with a loop or eye, $j$, at one end, and a cross-piece, $l$, in the middle, and of two blocks, $m$ and $n$, fitted between the sides of the rim at some distance from the cross-piece $l$ to form two apertures at both sides of the same. The bottom of the box G is contracted, and has one aperture, $o$, through which the seed will drop into one of the two apertures of the slide I as they arrive under $o$ during the reciprocating motion of the slide. From the latter the seed drops through one of two apertures, $q$, in a plate, $s$, between the cheeks of the scraper H, to the ground. The cross-piece of the seed-slide constitutes a cut-off on the plate $s$. Motion is imparted to the slides I either by a hand-lever, J, which is pivoted in ears projecting from the front of the seed-boxes and enters with its points the loop $j$, or automatically by levers L L, which are actuated by projecting pins $t$ on the wheels B. These levers L, being pivoted to the backs of the cross-pieces $g$, fit into the loops $j$ and reach back within range of the pins $t$. Whenever a pin, $t$, strikes a lever, L, it swings the same so as to carry the slide I forward. A spring, $u$, then carries the slide back and brings the lever in position for being vibrated by the next pin $t$. When the hand-lever J is used the slides are reversed so that the loop $j$ will be forward; otherwise they extend back, as shown. The throwing back of the seat in raising scrapers serves also to carry the levers L out of range of the pin $t$, so that no seed will be dropped during the turning of the machine from one row to another. The blocks $m$ and $n$ are made adjustable in the slides, so that the size of the drop-holes may thereby be regulated. This adjustment may be provided for by notches in the rim $i$, wherein projecting ribs of the blocks will fit, as indicated in Fig. 4. M is a scraper for the wheels, hung to the axle A so as to be under convenient control of the driver. N is a marker extending to the row last planted, for the purpose of insuring the keeping of proper distances and directions. The dropper's seat is also movable on the beam C, to have the same effect in its backward adjustment as the same adjustment of the driver's seat. The weights of both operators can thus be used for depressing the shoes or furrow-scrapers, and can also be taken entirely away from them without throwing any additional weight on the horses' necks.

What I claim as new, and desire to secure by Letters Patent, is—

1. The frame E $d$ $e$ $f$ jointed to the end of tongue D, and resting movably upon beam C, combined with sliding seat F, as and for the purpose specified.

2. The forked post E provided with the crosspiece $f$, and combined with the tongue D, seat-support $d$, and beam C, substantially as herein shown and described.

EZRA E. CHESNEY.

Witnesses:
A. W. VAN DYKE,
ROBERT S. RANDALL.

(133)